(12) United States Patent
Danford et al.

(10) Patent No.: US 9,633,202 B2
(45) Date of Patent: Apr. 25, 2017

(54) MANAGING A DDOS ATTACK

(71) Applicant: INTERNATIONAL BUSINESS MACHINES CORPORATION, Armonk, NY (US)

(72) Inventors: Robert W. Danford, Raleigh, NC (US); Terry D. Escamilla, Lafayette, CO (US); Kevin D. Himberger, Durham, NC (US); Clark D. Jeffries, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 13/854,594

(22) Filed: Apr. 1, 2013

(65) Prior Publication Data

US 2013/0219502 A1     Aug. 22, 2013

Related U.S. Application Data

(63) Continuation of application No. 10/940,558, filed on Sep. 14, 2004, now Pat. No. 8,423,645.

(51) Int. Cl.
*G06F 15/173*     (2006.01)
*G06F 21/55*      (2013.01)
(Continued)

(52) U.S. Cl.
CPC .......... *G06F 21/55* (2013.01); *H04L 63/1416* (2013.01); *H04L 63/1458* (2013.01);
(Continued)

(58) Field of Classification Search
CPC .. G06F 11/3495; G06F 2201/81; G06F 21/55; H04L 63/1416; H04L 2463/144
See application file for complete search history.

(56) References Cited

U.S. PATENT DOCUMENTS

| 6,789,203 B1 | 9/2004 | Belissent |
| 6,851,062 B2 * | 2/2005 | Hartmann ............... H04L 63/04 709/206 |

(Continued)

FOREIGN PATENT DOCUMENTS

WO      03001333 A2    1/2003

OTHER PUBLICATIONS

U.S. Appl. No. 10/940,558—Non-Final Office Action Mailed Mar. 18, 2008.
(Continued)

*Primary Examiner* — Scott B Christensen
*Assistant Examiner* — Thomas Richardson
(74) *Attorney, Agent, or Firm* — John Pivnichny; Law Office of Jim Boice

(57) ABSTRACT

A method, system, and/or computer program product manages a distributed denial of service attack in a multiprocessor environment. A determination is made of (a) a first upper threshold for a normal number of packets from the multiprocessor environment to multiple destination addresses, (b) a second upper threshold for a normal ratio of the packets from the multiprocessor environment to a single destination address compared to the packets from the multiprocessor environment to the multiple destination addresses, and (c) a third upper threshold for a normal ratio of packets from the multiprocessor environment to a single port at a single destination address compared to packets from the multiprocessor environment to the multiple destination addresses. In response to the first and second thresholds being exceeded, a specific port is monitored to determine if the third upper threshold is being exceeded at that port, thus indicating an apparent distributed denial of service attack.

12 Claims, 4 Drawing Sheets

(51) Int. Cl.
*H04L 29/06* (2006.01)
*G06F 11/34* (2006.01)

(52) U.S. Cl.
CPC ........ *G06F 11/349* (2013.01); *G06F 11/3495* (2013.01); *G06F 2201/81* (2013.01); *H04L 2463/141* (2013.01); *H04L 2463/144* (2013.01); *Y02B 60/165* (2013.01)

(56) References Cited

U.S. PATENT DOCUMENTS

| | | |
|---|---|---|
| 6,944,673 B2 | 9/2005 | Malan et al. |
| 7,107,619 B2 | 9/2006 | Silverman |
| 7,269,850 B2 | 9/2007 | Govindarajan et al. |
| 2002/0032717 A1 | 3/2002 | Malan et al. |
| 2002/0199109 A1 | 12/2002 | Boom |
| 2003/0037141 A1 | 2/2003 | Milo et al. |
| 2003/0145233 A1 | 7/2003 | Poletto et al. |
| 2003/0188189 A1 | 10/2003 | Desai et al. |
| 2003/0204621 A1 | 10/2003 | Poletto et al. |
| 2004/0054925 A1* | 3/2004 | Etheridge et al. ............ 713/201 |
| 2004/0062199 A1* | 4/2004 | Lau et al. ...................... 370/230 |
| 2004/0114519 A1* | 6/2004 | MacIsaac ...................... 370/232 |
| 2004/0250169 A1* | 12/2004 | Takemori ............ H04L 63/1425 714/38.1 |
| 2005/0198519 A1* | 9/2005 | Tamura et al. ................ 713/188 |
| 2005/0259645 A1 | 11/2005 | Chen et al. |
| 2006/0107318 A1* | 5/2006 | Jeffries et al. .................. 726/22 |

OTHER PUBLICATIONS

U.S. Appl. No. 10/940,558—Final Office Action Mailed Nov. 26, 2008.

U.S. Appl. No. 10/940,558—Examiner's Answer Mailed May 28, 2009.

\* cited by examiner

US 9,633,202 B2

MANAGING A DDOS ATTACK

The present application is a continuation of U.S. patent application Ser. No. 10/940,558, filed on Sep. 14, 2004, and titled, "Detection of Grid Participation in a DDoS Attack," which is incorporated herein by reference.

BACKGROUND

The present disclosure relates to the field of computers, and specifically to protecting computers. Still more particularly, the present disclosure relates to managing Distributed Denial of Service (DDOS) attacks in a multiprocessor environment.

Grid computing designers must solve several challenges before widespread commercial deployment can occur. One such challenge is the economic viability of a particular grid computing implementation. To a large extent the economic viability of a particular grid computing implementation is determined by three factors, reliability, security, and weaponry. Reliability as used herein means the computational latency guarantees. Security as used herein means the prevention of compromise of the data in the data stores on the grid. Weaponry as used herein means the resistance of the grid to being used as an identifiable entity in a Distributed Denial of Service ("DDoS") attack, and more particularly resistance to being maliciously taken over and converted into a platform to launch DDoS attacks on other computer assets.

SUMMARY

A method, system, and/or computer program product manages a distributed denial of service attack in a multiprocessor environment. A determination is made of (a) a first upper threshold for a normal number of outbound network packets from the multiprocessor environment to multiple destination addresses, (b) a second upper threshold for a normal ratio of the outbound network packets from the multiprocessor environment to a single destination address compared to the outbound network packets from the multiprocessor environment to the multiple destination addresses, and (c) a third upper threshold for a normal ratio of outbound network packets from the multiprocessor environment to a single port at a single destination address compared to outbound network packets from the multiprocessor environment to the multiple destination addresses. In response to the first and second thresholds being exceeded, a specific port is monitored to determine if the third upper threshold is being exceeded at that specific port, thus indicating an apparent distributed denial of service attack.

DETAILED DESCRIPTION

As used herein, a grid includes any subnet that is organized into or that can be organized into slices of address space (for example by logical connections, department, building, business unit, location, or the like) and not necessarily as a grid. The subnet could be monitored for indications of a DDoS attack. For example, one particular slice could be distinguished from the others by a traffic characteristic, and, within that one slice, many, most, or even all of the machines that are active have approximately the same behavior. In this way a loosely related set of assets (as processors, nodes, hubs, and storage) could be protected.

Grid Computing

The concept of a grid generally refers to a form of distributed computing in which various technological components, such as PCs and storage devices, are linked across dispersed organizations and locations to solve a single large computational problem.

Figure 1:
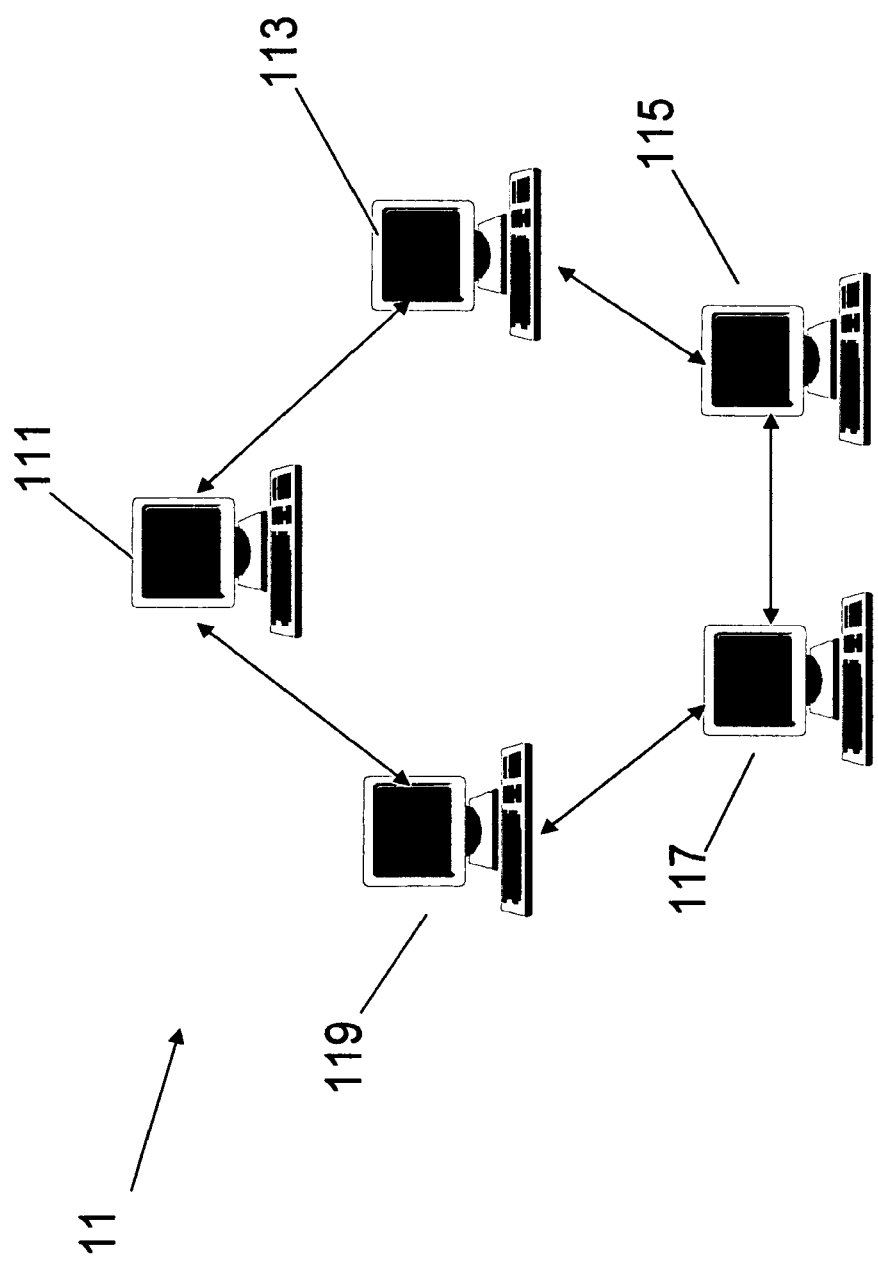
FIG. 1 illustrates a grid that comprises multiple elements, such as work stations.

With reference now to FIG. 1, a grid 11 includes, solely by way of illustration and not limitation, five elements, 111, 113, 115, 117, and 119, which are shown generally as work stations. However, the individual elements may themselves be subgrids, LANs, WANs, processors.

Figure 2:
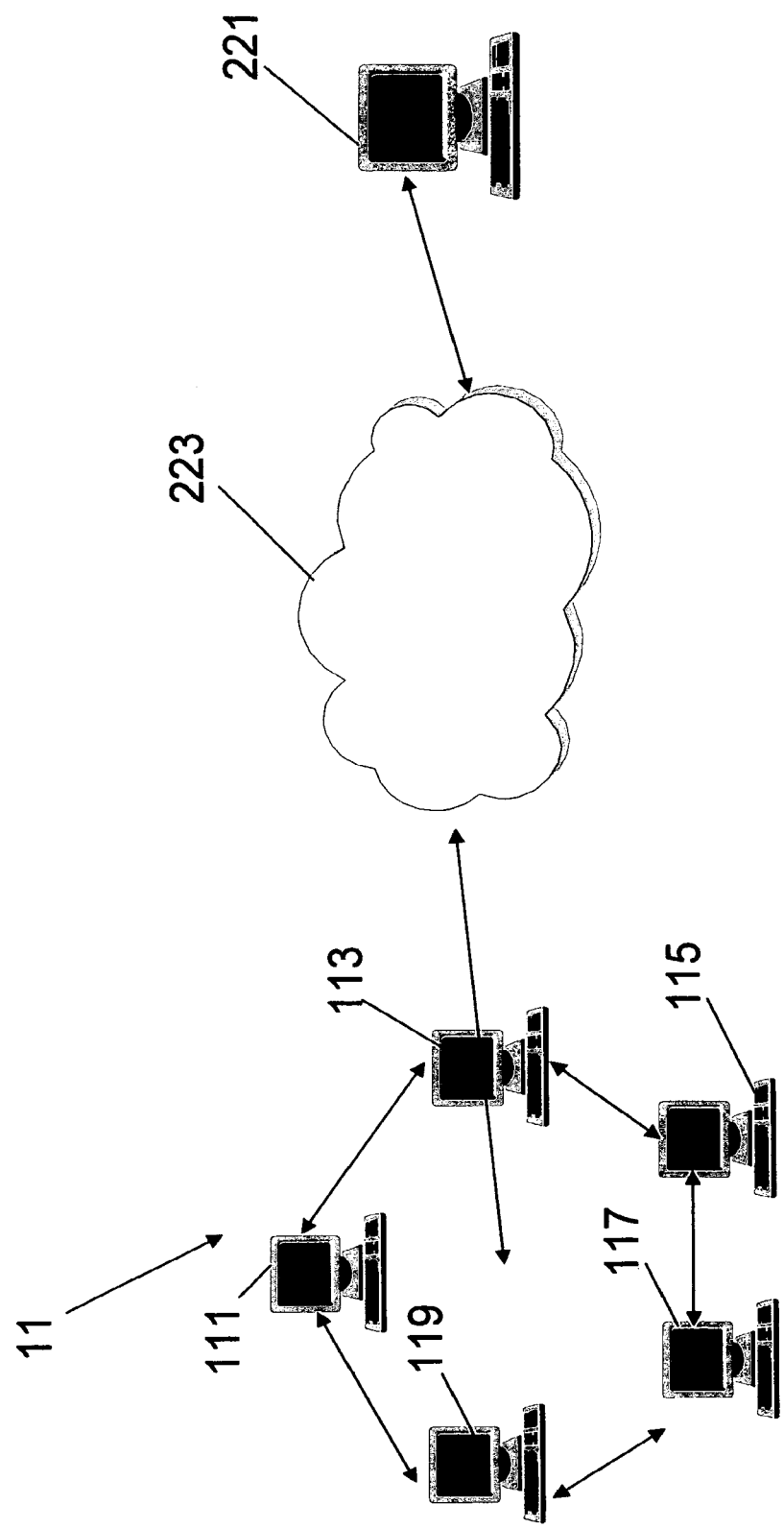
FIG. 2 depicts work stations accessing the grid through an internet.

FIG. 2 illustrates a grid 11, with elements, 111, 113, 115, 117, and 119, and a client workstation 221 accessing the grid 11 through an internet 223. In this context, grid computing is the application of the resources of many computers in one or more networks to a single problem at the same time—usually to a scientific or technical problem that requires a great number of computer processing cycles or access to large amounts of data. One example of grid computing is the ongoing SETI (Search for Extraterrestrial Intelligence) @Home project in which thousands of people are sharing the unused processor cycles of their PCs in the vast search for signs of "rational" signals from outer space.

Grid computing requires the use of software that can divide and farm out pieces of a program to as many as several thousand computers. Grid computing can be thought of as distributed, large-scale cluster computing and as a form of network-distributed parallel processing. Grid computing can be confined to a single network of computer workstations within a corporation or it can be a collaboration of a plurality of networks, for example, a public collaboration (in which case it is also sometimes known as a form of peer-to-peer computing).

Grid computing advantages include: (1) the ability to make more cost-effective use of a given amount of computer resources, (2) a way to solve problems that otherwise could not be approached without an enormous amount of computing power, and (3) the concept that the resources of many computers can be cooperatively and perhaps synergistically harnessed and managed as a collaboration toward a common objective. In some grid computing systems, the computers may collaborate rather than being directed by one managing computer.

Types of Grids

Grids can be data grids or computing grids.

A data grid is a grid used for sharing information. At a high level, data grid information sharing is like accessing information over the Internet but with deeper content than one would traditionally get, and with more requirements for "heavier lifting" or effort and intensity in terms of computational resources.

A computing grid, on the other hand, is for the heavy crunching of numbers, and for telescoping the time necessary to arrive at the answer.

Security

Security issues are addressed by the grid masters, particularly if the grid will be a multi-company or multi-entity project. Entities that don't institute security measures run the risk of attack by anybody who owns a machine on the grid being able to 'eavesdrop' on grid computations running on that unit, and even distribute zombie software for subsequent denial of service attacks.

Denial of Service Attacks

On the Internet, a denial of service (DoS) attack is an incident in which a user or organization is deprived of the services of a resource they would normally expect to have. Typically, the loss of service is the inability of a particular network service, such as e-mail, order entry, transaction processing, or database management, to be available or the temporary loss of all network connectivity and services. In the worst cases, for example, a Web site accessed by millions of people, such as on line banking, credit card processing, airline and other travel reservation processing, e-commerce, and on-line auction services, can occasionally be forced to temporarily cease operation. A denial of service attack can also destroy programming and files in a computer system. Although usually intentional and malicious, a denial of service attack can sometimes happen accidentally. A denial of service attack is a type of security breach to a computer system that does not usually result in the taking of information or other security loss. However, these attacks can cost the target person or entity a great deal of time and money.

Figure 3:
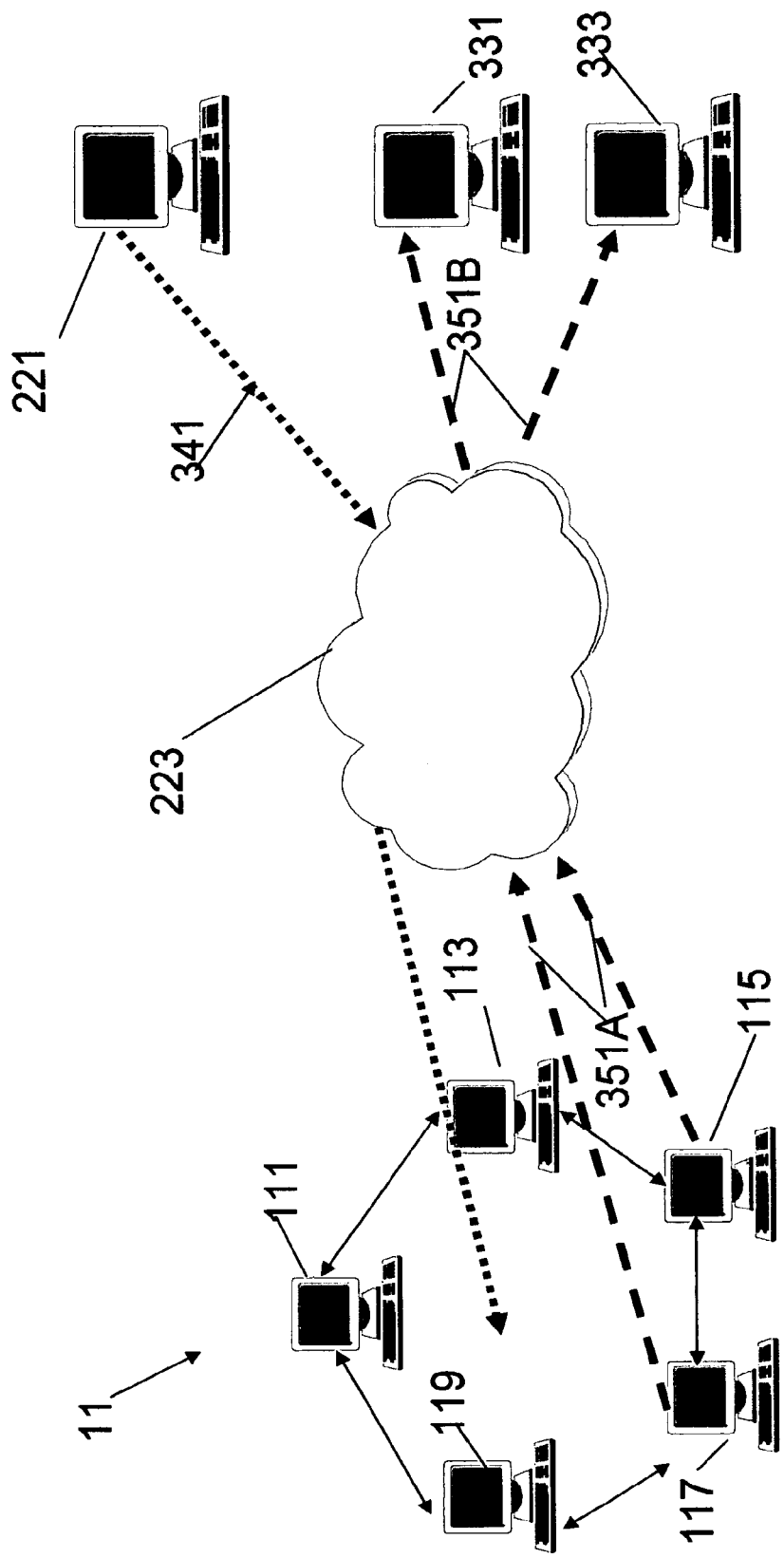
FIG. 3 illustrates a grid in which a Distributed Denial of Service (DDoS) attack is being launched by planting harmful code in grid elements on ultimate victim/targets.

FIG. 3 illustrates a grid 11 (with elements, 111, 113, 115, 117, and 119, shown generally as work stations) and a client workstation 221 accessing the grid 11 through an internet 223 to initiate a DDoS attack 341, by planting harmful code in grid elements 115 and 117 (taken over as zombies) to stage attacks 351A and 351B on targets 331 and 333 which are external to the grid 111.

Common Forms of Denial of Service Attacks: Buffer Overflow Attacks

The most common kind of DoS attack is simply to send more traffic to a network address than the programmers who planned its data buffers anticipated someone might send. The attacker may be aware that the target system has a weakness that can be exploited or the attacker may simply try the attack in case it might work. A few of the better-known attacks based on the buffer characteristics of a program or system include:

Sending e-mail messages that have attachments with 256-character file names to Netscape and Microsoft mail programs;

Sending oversized Internet Control Message Protocol (ICMP) packets; and

Sending to a user of the Pine e-mail program a message with a "From" address larger than 256 characters.

SYN Attack

When a session is initiated between the Transport Control Program (TCP) client and server in a network, a very small buffer space exists to handle the usually rapid "hand-shaking" exchange of messages that sets up the session. The session-establishing packets include a SYN field that identifies the sequence in the message exchange. An attacker can send a number of connection requests very rapidly and then fail to respond to the reply. This leaves the first packet in the buffer so that other, legitimate connection requests can't be accommodated. Although the packet in the buffer is dropped after a certain period of time without a reply, the effect of many of these bogus connection requests is to make it difficult for legitimate requests for a session to get established. In general, this problem depends on the operating system providing correct settings or allowing the network administrator to tune the size of the buffer and the timeout period.

Teardrop Attack

This type of denial of service attack exploits the way that the Internet Protocol (IP) requires a packet that is too large for the next router to handle be divided into fragments. The fragment packet identifies an offset to the beginning of the first packet that enables the entire packet to be reassembled by the receiving system. In the teardrop attack, the attacker's IP puts a confusing offset value in the second or later fragment. If the receiving operating system does not have a plan for this situation, it can cause the system to crash.

Smurf Attack

In a smurf attack, the perpetrator sends an IP ping (or "echo my message back to me") request to a receiving site The ping packet specifies that it be broadcast to a number of hosts within the receiving site's local network. The packet also indicates that the request is from another site, the target site that is to receive the denial of service. (Sending a packet with someone else's return address in it is called spoofing the return address.) The result will be lots of ping replies flooding back to the innocent, spoofed host. If the flood is great enough, the spoofed host will no longer be able to receive or distinguish real traffic.

Viruses

Computer viruses, which replicate across a network in various ways, can be viewed as denial-of-service attacks where the victim is not usually specifically targeted but simply a host unlucky enough to get the virus. Depending on the particular virus, the denial of service can be hardly noticeable ranging all the way through disastrous.

Zombie Attacks

In at least one form of denial of service attack, one or more insecure assets, such as PC's, workstations, or Web servers, are compromised by malicious attackers who place code in each intermediate target which, when triggered, will launch an overwhelming number of attacks, such as service requests, toward an attacked ultimate target, typically a target Web site. The ultimate target will soon be unable to service legitimate requests from its users. A compromised intermediate target that is used as an attack launch point to launch DDoS attacks upon an ultimate target is known as a zombie.

While the usual zombie attack consists of a steady (and therefore more easily traced) stream of attack traffic intended to overwhelm one or more target computers, a pulsing zombie attack consists of irregular bursts of traffic intended to hamper service. It is more difficult to locate the source of an attack from a pulsing zombie, or even to know that an attack has taken place. Pulsing zombie attacks have been known to go on for months before they are detected; in one case, a victim received six times its normal traffic volume for several months.

Distributed Denial of Service Attacks in a Grid Computing Environment

Resistance of the grid and the grid elements to being identifiable elements, that is intermediate targets or potential zombies, in a DDoS attack is an overarching issue limiting commercial deployment of grid installations. To date, DDoS have been very costly to a small sub-set of targets. However, the spread of zombies has heretofore been considered to be in multiple and unrelated portions of IP address space. For this reason any bad practices, such as failure to do due diligence, by the subnet administrators responsible for the zombies have not been readily identifiable.

As described above, there are many kinds of DDoS attacks. A simple DDoS attack might be a flood of TCP SYN packets, a flood of UDP packets to a well-known port such as port 53 (DNS) or 161 (SNMP), or a flood of ICMP PING packets. In particular, TCP SYN floods have been an unfortunate part of Internet business risks. This has led to countermeasures such as TCP splicing and huge connection tables in firewall accelerators.

In contrast to brute force floods, a more complex DDoS might establish a TCP session with the victim and then overwhelm the victim with Port 443 (SSL HTTPS) secure session initiators that never complete or that are purposefully malformed. The important advantage of SSL floods to an attacker or perpetrator would be that far fewer sources would be needed. Even a large SSL server may be able to handle only a few thousand SSL initiations per second. This is in contrast to a firewall accelerator that holds a million sessions in a connection table.

The common theme in all DDoS attacks is to recruit zombies that act upon a signal (including a time of day signal generated by the operating system) to send to an ultimate victim so much traffic of a particular kind that computational resources of the ultimate victim are overwhelmed. For this reason, weaponry, that is, the resistance of the grid to being used as an identifiable entity (that is, an intermediate target or zombie) in a Distributed Denial of Service ("DDoS") attack becomes a design, implementation, and deployment issue.

An attacker might remotely discover the vulnerability of a grid or its elements, for example by finding many machines with similar IP addresses (or the same IP address in the presence of a NAT) with many ports open (available and responding). Generally, these would not be well known port numbers. For example, most port numbers 9000 to 32000 would not be well known port numbers.

To an attacker, it might be obvious that machines similar in address would also be similar in operating system, applications, service pack levels, and patch levels, and to therefore have the same vulnerabilities. That is, a massive grid of many nodes may be vulnerable in the same sense as an entire network of Windows 2000 machines. For an attacker, many machines with the same unpatched vulnerability could be taken control of quickly. This could be with, for example, a worm infection or an auto rooter. The result is that it would be easy to compromise several machines in one grid. In the case of a DDoS attack, the attack may make the attacked machines into zombies.

Once elements in the grid have been taken over by a DDoS attack, it is relatively easy to prove that much or most of the subsequent outgoing attacks came from a specific grid.

Thus, there is a need to detect outbound attack traffic from an infected grid to facilitate identification, reaction, and remediation, and limit the participation of the grid in a subsequent DDoS attack.

Moreover, a need exists to include recognition of grid participation in a DDoS attack by statistical measures that are indicative of a DDoS attack, enabling effective and automatic response to a DDoS attack.

It is therefore an object of the present invention to provide a method, system, and apparatus to detect outbound attack traffic from an infected grid to facilitate identification, reaction, and remediation, and limit the participation of the grid in a subsequent DDoS attack. DDoS detection is accomplished by statistical analysis of incoming and outgoing streams.

The invention provides a method of, system for, and product for managing a denial of service attack in a multiprocessor environment, that is, a grid environment. This is accomplished by detection of statistical characteristics and statistical anomalies, through statistical analysis of incoming and outgoing streams. The first step is establishing normal traffic usage baselines in the multiprocessor environment. Once the baseline is established the next step is monitoring outgoing traffic to detect a high proportion of packets being sent to a specific destination address (potentially an ultimate target or victim), and a high number of outbound packets compared to said baseline. Next is monitoring ports and protocols to detect a high proportion of packets sent to a specific port, and a consistent use of a protocol for many or all of the packets for that port. If there is such consistent use of a protocol for all packets for that port as to evidence a distributed denial of service attack, blocking measures are started to mitigate the apparent distributed denial of service attack.

A DDoS attack launched from a grid, that is, from one or more elements of a grid, e.g., within one or a few subnets, would exhibit certain traffic characteristics. These traffic characteristics (where "TC" means "traffic characteristic"):

The Destination Address fields in the IP headers seen in the attack traffic all or almost all have one value or a small number of values.

The Destination Port in the UDP or TCP headers seen in the attack traffic would have one value or a few values. The port could be that of a service that is correctly available such as Port 80 (WWW) or Port 443 (SSL). In some cases the packet length could be constant.

The DDoS traffic would have a very high bandwidth in a constant flow or in a bursty flow. It is noted that a bursty flow would be more difficult to detect with a high degree of certainty. Note that as to a DDoS attack characterized by constant or nearly constant traffic, the purpose of the DDoS attack is to halt legitimate use of a network resource by overloading its processing capacity or bandwidth, and consequently there must be a relatively constant stream of traffic going to the target.

There may be a high rate of TCP or SSL timeouts in some cases, resulting in high rates of inbound TCP RST or FIN traffic. Generally, neither TCP timeouts nor SSL timeouts are expected in mass quantities in normal traffic, and, therefore, when such time outs are seen in large numbers, a DDoS is evidenced.

Traffic could also be any of the other 254 protocol. Floods with protocol (IP 15 header TYPE field)=0 are common, as are ICMP floods (Protocol=1).

Two statistical anomalies could be recognized. First, there would likely be within the subnet address space a contiguous or nearly contiguous slice of addresses sending traffic that is distinguished by TC1 . . . TC5 from all other traffic from the subnet. Second, in the presence of a DDoS attack, within that slice the traffic characteristics of the different machines would be very similar.

As stated herein, FIG. 3 illustrates a grid 11 (with elements, 111, 113, 115, 117, and 119), shown generally as work stations and a client workstation 221 accessing the grid 11 through an internet 223 to initiate a DDoS attack 341, by planting harmful code in grid elements 115 and 117 to stage attacks 351A and 351B on targets 331 and 333. As shown in FIG. 3, grid 11 is under a DDoS attack to mount a DDoS attack on processors 331 and 333 from zombie code surreptitiously planted on processors 115 and 117.

The practice of the present invention starts from the recognition that within the normal stream of inbound and outbound traffic for a subnet that supports a grid there is the unusual and anomalous presence of a dominating subset of packets with one or more of the above anomalous traffic characteristics. Source addresses of the anomalous traffic would be within a slice of full address space, and the statistics of the slice traffic would be very different from normal traffic. Moreover, the statistics and traffic characteristics of the anomalous traffic within a slice could be very similar from machine to machine.

As described above, there are many kinds of DDoS attacks. A simple DDoS attack might be a flood of TCP SYN packets, a flood of UDP packets to a well-known port such as port 53 (DNS) or 161 (SNMP), or a flood of ICMP PING packets. In particular, TCP SYN floods have been an unfortunate part of Internet business risks. This has led to countermeasures such as TCP splicing and huge connection tables in firewall accelerators.

In contrast to brute force floods, a more complex DDoS might establish a TCP session with the target or ultimate victim and then overwhelm the target or ultimate victim with Port 443 (SSL HTTPS) secure session initiators that are never completed or that are purposefully malformed. The important advantage of SSL floods would be that far fewer sources (that is intermediate targets or zombies) would be needed. Even a large SSL server may be able to handle only a few thousand SSL initiations per second. This is in contrast to a firewall accelerator that holds a million sessions in a connection table.

The common theme in all DDoS attacks is to recruit zombies that act upon a signal to send to a victim so much traffic of a particular kind that computational resources of the victim are overwhelmed.

Detection and Recognition of a DDoS Attack

The invention will be illustrated by four types of outbound DDoS attacks.

TCP DDoS Attack. Detection for a TCP attack would include an anomalous amount of SYN traffic directed to o destination or a small number of destinations. Of the four TCP flags, SYN, ACK, FIN, and RST, there must be at least one flag set (=1), and among SYN, FIN, and RST there must be at least one set (=1). In an outbound DDoS there might be anomalously high levels of TCP flag combinations other than SYN including illegal flag combinations. Another indication of a TCP DDoS Attack would be a radical departure from typical ratios of the four TCP flags with respect to one another. Namely, there should be approximately equal quantities of SYN and SYN/ACK. Over a long period, there would be approximately equal quantities of SYN and FIN. There should not be an excessive amount of RST relative to all types that are non-RST.

ICMP Attack. Detection for ICMP would include an excessive level of Ping packets (with Destination Port (DP)=8). During a successful attack the ratio of outbound Ping packets to inbound Ping Echo packets (with DP=11) would be higher than the normally expected ratio of 1 to 2.

UDP Attack. Detection for UDP would include an excessive level of packets, likely with one DP or a few DP values. The ratio of UDP to TCP might be considered, as normally both would cycle twenty-four hours and over seven days.

SSL (HTTPS) Attack. An SSL attack would include correct initiation of a TCP session but then only part of an SSL secure session. Some SSL fields could purposefully be incorrect or illegal. The number of SSL truncated sessions needed to clog a server might be much lower than the number of TCP SYNs to have the same effect. Consequently, bandwidth could be high for SSL DDoS attacks, for example more than 100 initiated sessions per minute, relative to normal SSL. This might not be noticeable if embedded in all other TCP traffic, especially all other TCP. Thus, an SSL DDoS might include an unduly high ratio of SSL versus other TCP, or an unduly high ratio to SSL timeouts versus all SSL traffic.

Methods of Detection

There are several primary methods that could be used to signal that an outbound grid attack is underway from intermediate targets or zombies in a grid that is being monitored. These methods of detection are based on determining traffic type, traffic volume across the grid, and that one or a small subset of subnet address space is very different from the rest of subnet address space, for example by traffic volume, type of traffic, or protocol, but that with the small subset of subnet address space the traffic from machine to machine is very similar.

One method would be to establish normal traffic and establish and define baselines. These baselines could include proportions of protocol usage (TCP, UDP, and ICMP) and services commonly used (HTTP, HTTPS, MS-SQL-M, DNS, etc.). Comparison with the established baselines would start the blocking measures to mitigate a possible attack.

Figure 4:
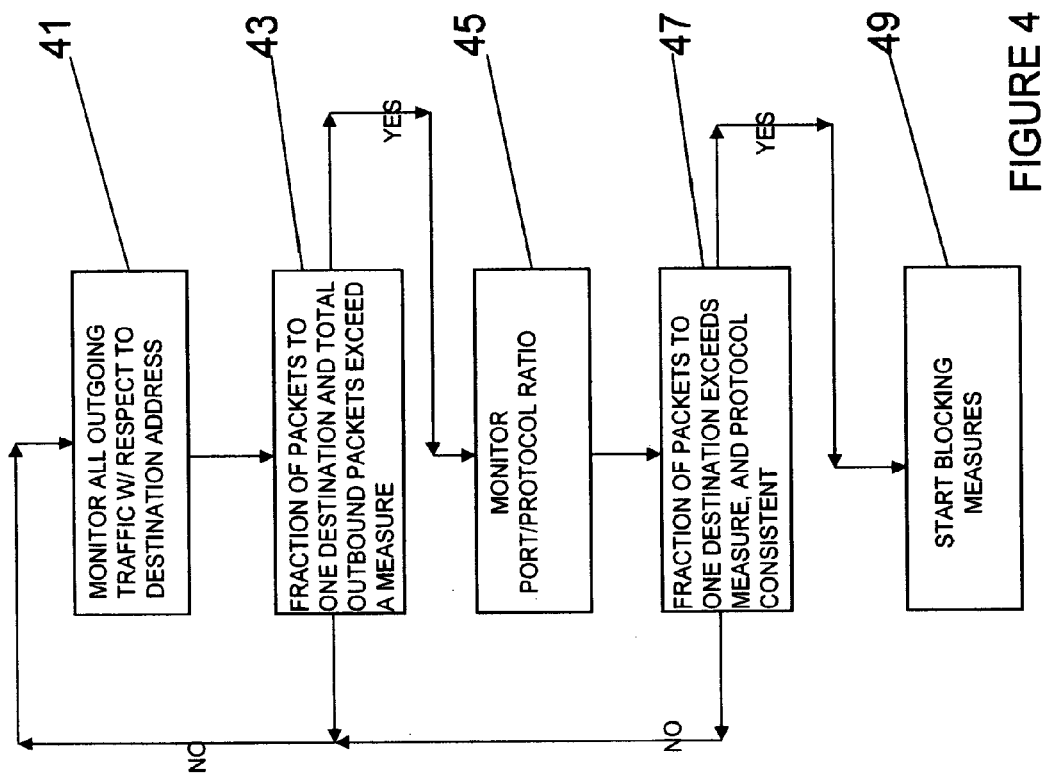
FIG. 4 is a high level flow chart depicting one or more operations performed by a processor to manage DDoS attacks in a multiprocessor environment.

An algorithmic method, having the flow chart shown in FIG. 4, starts by monitoring outgoing traffic with respect to the destination address (block 41). If the ratio of the number of packets to a particular destination address to the total number of packets outbound is greater than some number (for example, 0.5) and the total number of outbound packets is above a preset value (block 43), selected ports and protocols are monitored (block 45). For example, if the ratio of the number of packets to a port to the total number of packets to all ports is above some value (for example, 0.5), and the protocol used is consistent across all or a large fraction of ports (block 47), blocking measures are commenced to block a possible attack (block 49).

It should be noted that over reliance on the ratio of the number of packets to a particular destination address to the total number of packets outbound being greater than some number (for example, 0.5) and the total number of outbound packets being above a preset value, can lead to false positives, and the administrator should disallow continued monitoring of the IP address. This is the case because distributed denial of service attacks often last for an extended period of time. Thus, the pain threshold reached after a few hours may not be significant compared to the pain threshold after, say, 96 hours, it would be feasible to delay action to allow for administrator interaction.

An alternative detection tool is detecting an uncommon fraction of timeouts coming from one slice of the subnet address space, detecting that the traffic from that slice of subnet address space is different from normal and from other elements in the subnet, or that the traffic within the slice has an unusually high degree of uniformity from machine to machine within the subnet.

The most common cases of DDoS will typically include the Destination Address field in the IP headers seen in the attack traffic all having one value or a small number of values, and the Destination Port in the UDP or TCP headers having a small set of values, such as one value or a few values. Alternatively, in the case of ICMP attacks, the fraction of ICMP packets would be abnormally high. This means that the detection functions by realizing multiple machines (intermediate targets converted into zombies) in the grid are attacking the same address at the same port. In this regard, the port used would also imply a particular protocol (such as Port 1434 for UDP and Port 80 for TCP) which, in turn, leads to easier distillation and correlation between disparate grid actions.

Blocking Measures

All modern routers and firewalls are capable of filtering in Layer 4 (in the OSI stack of protocols). This implies filter rules could be specified to block (discard and report) any combination of one or a few IP source addresses and one or a few IP source ports. In some cases, more sophisticated blocking could be applied to packets in a specific stage of a hand-shake system of some combination of application for service, reply, password request, password submission, identification, authentication, authorization, or any part of any cryptologic process (such as any part of the public key exchange process). The present invention uses but does not include such blocking capabilities.

In one embodiment, the automatic imposition of blocking measures is a dynamic period of imposition.

It is an object of the invention to provide a method, system, and apparatus to detect outbound attack traffic from an infected grid to facilitate identification, reaction, and remediation, and limit the participation of the grid in a subsequent DDoS attack.

A further object of the invention is to recognize grid participation in a DDoS attack by statistical measures that are indicative of a DDoS attack, and to thereby enable effective and automatic response to a DDoS attack.

The invention provides a method of, system for, and product for managing a distributed denial of service attack launched from malicious code in a multiprocessor environment, such as a grid computing environment. This is done by statistical analysis of outgoing packets from the multiprocessor environment. The first step is establishing normal traffic usage baselines in the multiprocessor environment. Once the baseline is established the next step is monitoring outgoing traffic to detect a high proportion of packets being sent to a specific destination address, and a high number of outbound packets compared to the baseline. Next is monitoring ports and protocols to detect a high proportion of packets sent to a specific target port, and a consistent use of one or a small number of protocols for most or all packets for that ultimate target port. If there is such consistent use of a protocol for all packets for that port as to evidence a distributed denial of service attack, blocking measures are started to mitigate the apparent distributed denial of service attack.

The present invention may be implemented, for example, by having the system for managing a distributed denial of service attack as a software application (as an operating system element), a dedicated processor, or a dedicated processor with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for managing a denial of service attack in a multiprocessor environment. This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or other similar types of storage devices. As an example, the machine-readable instructions stored on a storage device may comprise software object code, compiled from a language such as "C++", Java, Pascal, assembler, and the like. Additionally, the program code may, for example, be compressed, encrypted, or both, and may include executable files, script files and wizards for installation, as in Zip files and cab files.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer program product for managing a distributed denial of service attack in a multiprocessor environment, the computer program product comprising:

one or more non-transitory computer-readable storage devices and program instructions stored on at least one of the one or more computer-readable storage devices, the program instructions comprising:

program instructions to determine
(a) a first upper threshold for a normal number of outbound network packets from the multiprocessor environment to multiple destination addresses on a network,
(b) a second upper threshold for a normal ratio of the outbound network packets from the multiprocessor environment to the multiple destination addresses, and
(c) a third upper threshold for a normal ratio of outbound network packets from the multiprocessor environment to a single port at a single destination address compared to outbound network packets from the multiprocessor environment to the multiple destination addresses;

program instructions to:
monitor the number of outgoing packets from the multiprocessor environment with respect to the multiple destination addresses, and
based on the monitoring of the outgoing packets from the multiprocessor environment, detect that the first upper threshold and the second upper threshold are exceeded in the multiprocessor environment, and
initiate monitoring of a specific port and protocol at the single destination address, the specific port being monitored to detect a high proportion of packets sent to the specific port, and the protocol being monitored to detect a consistent use of the protocol for all packets at the specific port;

program instructions to,
based on the initiated monitoring of the specific port and protocol, detect that the third upper threshold is exceeded for the outbound network packets being sent to the specific port being monitored and detect a consistent use of the protocol for all packets at the specific port, and
initiate monitoring of the outgoing traffic to detect a high proportion of timeouts compared to baseline values of timeouts coming from a portion of a subnet address space of said network in order to determine that an apparent distributed denial of service attack is in progress;

program instructions to,
based on detecting a high proportion of timeouts compared to said baseline values coming from said portion of a subnet address space of said network, start blocking measures to mitigate the apparent distributed denial of service attack; and program instructions to notify an administrator of the multiprocessor environment of the apparent distributed denial of service attack.

2. The computer program product of claim 1, further comprising program instructions stored on at least one of the one or more non-transitory computer readable storage devices, to:
in response to a ratio of (i) a number of packets to a particular destination address to (ii) a total number of packets outbound being greater than a predetermined number leading to a false positive indication of the apparent distributed denial of service attack, issue an instruction to the administrator of the multiprocessor environment to disallow continued monitoring of the particular destination address.

3. The computer program product of claim 1, further comprising program instructions stored on at least one of the one or more non-transitory computer readable storage devices, to:
in response to detecting a high proportion of outbound network packets sent to the specific port, commence blocking measures to mitigate the apparent distributed denial of service attack.

4. The computer program product of claim 1, wherein the apparent distributed denial of service attack is an outbound denial of service attack.

5. The computer program product of claim 1, further comprising program instructions stored on at least one of the one or more non-transitory computer readable storage devices, to:
monitor outgoing traffic with respect to a specific destination address;
in response to a ratio of (i) a number of packets to said specific destination address to (ii) a total number of packets outbound being greater than a preset number and the total number of outbound packets is above a preset value, monitor selected ports and protocols;
in response to the ratio of (i) a number of packets to one of said selected ports to (ii) a total number of packets to all of said selected ports being above a preset value, and in response to a protocol used by packets being sent to the specific destination address being consistent across more than a predetermined percentage of the selected ports, commence blocking measures to end the apparent distributed denial of service attack.

6. The computer program product of claim 1, wherein the multiprocessor environment is a grid computer environment.

7. A computer system for managing a distributed denial of service attack in a multiprocessor environment, the computer system comprising:
one or more processors, one or more computer-readable memories, one or more computer-readable storage devices, and program instructions stored on at least one of the one or more computer-readable storage devices for execution by at least one of the one or more processors via at least one of the one or more computer-readable memories, the program instructions comprising:
first program instructions to determine (a) a first upper threshold for a normal number of outbound network packets from the multiprocessor environment to multiple destination addresses on a network, (b) a second upper threshold for a normal ratio of the outbound network packets from the multiprocessor environment to a single destination address compared to the outbound network packets from the multiprocessor environment to the multiple destination addresses, and (c) a third upper threshold for a normal ratio of outbound network packets from the multiprocessor environment to a single port at a single destination address compared to outbound network packets from the multiprocessor environment to the multiple destination addresses;
second program instructions to monitor the number of packets from the multiprocessor environment with respect to the multiple destination addresses, and based on the monitoring, detect that the first upper threshold and the second upper threshold are exceeded in the multiprocessor environment, and in response, initiate monitoring of a specific port at the single destination address;

third program instructions to establish baseline values for normal network traffic usage in the multiprocessor environment;

fourth program instructions to monitor outgoing traffic to detect a high proportion of packets being sent to a specific destination address with respect to all destination addresses, and a high number of outbound packets compared to said baseline values;

fifth program instruction to, based on detecting a high proportion of packets being sent to said specific destination address, and a high number of outbound packets compared to said baseline values, initiate monitoring of the port and protocol of outbound packets to detect a high proportion of packets sent to a specific port, and a consistent use of a protocol for all packets for that port;

sixth program instructions to, based on the monitoring of the port and protocol of outbound packets, detect that the third upper threshold is exceeded for the outbound network packets being sent to the specific port being monitored, and based on the detection, determine that an apparent distributed denial of service attack is in progress;

seventh program instructions to, based on detecting a high proportion of packets sent to a specific port, and a consistent use of a protocol for all packets for that port, initiate monitoring of outgoing traffic to detect a high proportion of timeouts compared to said baseline values coming from a portion of a subnet address space of said network; and eighth program instructions to, based on detecting a high proportion of timeouts compared to said baseline values coming from said portion of a subnet address space of said network, start blocking measures to mitigate the apparent distributed denial of service attack; and ninth program instructions to notify an administrator of the multiprocessor environment of the apparent distributed denial of service attack.

8. The computer system of claim 7, further comprising:
tenth program instructions, stored on at least one of the one or more computer-readable storage devices for execution by at least one of the one or more processors via at least one of the one or more computer-readable memories, to, in response to a ratio of (i) a number of packets to a particular destination address to (ii) a total number of packets outbound being greater than a predetermined number leading to a false positive indication of the apparent distributed denial of service attack, issue an instruction to the administrator of the multiprocessor environment to disallow continued monitoring of the particular destination address.

9. The computer system of claim 7, further comprising:
tenth program instructions, stored on at least one of the one or more computer-readable storage devices for execution by at least one of the one or more processors via at least one of the one or more computer-readable memories, to, in response to detecting a high proportion of outbound network packets sent to the specific port, commence blocking measures to mitigate the apparent distributed denial of service attack.

10. The computer system of claim 7, wherein the apparent distributed denial of service attack is an outbound denial of service attack.

11. The computer system of claim 7, further comprising:
tenth program instructions, stored on at least one of the one or more computer-readable storage devices for execution by at least one of the one or more processors via at least one of the one or more computer-readable memories, to monitor outgoing traffic with respect to a specific destination address;

eleventh program instructions, stored on at least one of the one or more computer-readable storage devices for execution by at least one of the one or more processors via at least one of the one or more computer-readable memories, to, in response to a ratio of (i) a number of packets to said specific destination address to (ii) a total number of packets outbound being greater than a preset number and the total number of outbound packets is above a preset value, monitor selected ports and protocols; and twelfth program instructions, stored on at least one of the one or more computer-readable storage devices for execution by at least one of the one or more processors via at least one of the one or more computer-readable memories, to, in response to the ratio of (i) a number of packets to one of said selected ports to (ii) a total number of packets to all of said selected ports being above a preset value, and in response to a protocol used by packets being sent to the specific destination address being consistent across more than a predetermined percentage of the selected ports, commence blocking measures to end the apparent distributed denial of service attack.

12. The computer system of claim 7, wherein the multiprocessor environment is a grid computer environment.

* * * * *